(12) United States Patent
Ciaramitaro et al.

(10) Patent No.: US 11,348,188 B2
(45) Date of Patent: May 31, 2022

(54) SYSTEM, COMPUTER PROGRAM, AND METHOD FOR ONLINE, REAL-TIME DELIVERY OF CONSUMER TAX SERVICE

(71) Applicant: HRB Tax Group, Inc., Kansas City, MO (US)

(72) Inventors: Mark Ciaramitaro, Leawood, KS (US); Kenneth Meade, Jr., Overland Park, KS (US); Neal Shaw, Shawnee, KS (US)

(73) Assignee: HRB Tax Group, Inc., Kansas City, MO (US)

( * ) Notice: Subject to any disclaimer, the term of this patent is extended or adjusted under 35 U.S.C. 154(b) by 158 days.

(21) Appl. No.: 16/371,473

(22) Filed: Apr. 1, 2019

(65) Prior Publication Data

US 2019/0228474 A1    Jul. 25, 2019

Related U.S. Application Data

(63) Continuation of application No. 13/250,280, filed on Sep. 30, 2011, now Pat. No. 10,249,004.

(60) Provisional application No. 61/388,907, filed on Oct. 1, 2010.

(51) Int. Cl.
*G07F 19/00* (2006.01)
*G06Q 40/00* (2012.01)

(52) U.S. Cl.
CPC .................................. *G06Q 40/123* (2013.12)

(58) Field of Classification Search
None
See application file for complete search history.

(56) References Cited

U.S. PATENT DOCUMENTS

| | | | |
|---|---|---|---|
| 6,240,444 B1 * | 5/2001 | Fin .......................... | H04L 29/06 709/205 |
| 7,653,592 B1 * | 1/2010 | Flaxman ................ | G06Q 40/00 705/38 |
| 2003/0101114 A1 * | 5/2003 | Delapass ................ | G06Q 30/02 705/31 |
| 2008/0071600 A1 * | 3/2008 | Johnson ......... | G06Q 10/063112 705/7.14 |
| 2009/0138317 A1 * | 5/2009 | Schoenberg ........ | H04L 67/2809 705/2 |

(Continued)

FOREIGN PATENT DOCUMENTS

WO    WO-2009137164 A2 * 11/2009    ............. G06Q 40/08

*Primary Examiner* — Ariel J Yu
(74) *Attorney, Agent, or Firm* — Erise IP, P.A.

(57) ABSTRACT

A system, a method, and a computer program for performing an online, real-time tax consultation for preparation of a client's taxes by a tax agent, wherein the tax agent is remote from the client, and the system is implemented via an electronic, online application accessible via a communications network. Embodiments allow for a client desiring tax preparation of a tax return to initiate the tax preparation with a tax agent via an online, integrated platform; electronically upload or otherwise push the client's tax-related information and documents to the tax agent; participate in an online tax consultation so that the tax agent may investigate, learn, or otherwise obtain the tax information necessary for completing the client's tax return; and electronically approve and file the completed tax return.

20 Claims, 12 Drawing Sheets

(56) References Cited

U.S. PATENT DOCUMENTS

2010/0112530 A1* 5/2010 Schoenbach .......... G09B 21/00
434/116

* cited by examiner

FIG. 5

H & R Block  Tax Agent Live

Find a Tax Agent

Location: 64105
Expertise: Small business, self-employed Investments / stock optio...
Edit location & expertise Search by: | Availability | Find a Specific Tax Agent |

Availability

⦿ Now (33 tax agents available now) — 30

[☐ AVAILABLE NOW] GARY MEYER
Kansas City, Mo
View Profile >
[SCHEDULE APPOINTMENT] [CONNECT NOW]

[☐ AVAILABLE NOW] JOE BROWN — 32
Miami, FL
View Profile >
[SCHEDULE APPOINTMENT] [CONNECT NOW]

[☐ AVAILABLE NOW] BOB SULLIVAN
New York, NY
View Profile >
[SCHEDULE APPOINTMENT] [CONNECT NOW]

○ Available for appointment (closest to zip code: 64150 Edit)

Display Tax Agents "Available Now":
1) Tax Agents "Available Now", in 25 closest locations to my zip code.
2) If none within 100 miles of me, Tax Agents "Available Now" in my State
3) If none in my state, Tax Agents available nationally with the necessary skills to prepare my state return.

SYSTEM, COMPUTER PROGRAM, AND METHOD FOR ONLINE, REAL-TIME DELIVERY OF CONSUMER TAX SERVICE

RELATED APPLICATION

The present application is a continuation, and claims priority benefit, with regard to all common subject matter, of earlier-filed U.S. patent application Ser. No. 13/250,280, filed Sep. 30, 2011, now U.S. Pat. No. 10,249,004, issued Apr. 2, 2019, and entitled "SYSTEM, COMPUTER PROGRAM, AND METHOD FOR ONLINE, REAL-TIME DELIVERY OF CONSUMER TAX SERVICES," ("The '004 Patent"). The '004 Patent is a non-provisional utility application and claims priority benefit, with regard to all common subject matter, of earlier-filed U.S. Provisional Patent Application entitled "SYSTEM, METHOD, AND COMPUTER SOFTWARE FOR A VIRTUAL TAX OFFICE," Ser. No. 61/388,907, filed Oct. 1, 2010. The identified earlier-filed patent and patent application are hereby incorporated by reference into the present application in their entirety.

BACKGROUND

1. Field

Embodiments of the present invention relate to a system, a computer program, and a method for delivering consumer tax services via an online, real-time, and secure platform. More particularly, embodiments of the present invention relate to a system, a computer program, and a method for allowing a client and a tax agent to perform an online, real-time tax consultation to assist the tax agent in the preparation of the client's tax return.

2. Related Art

Existing face-to-face consumer tax services, including tax preparation services, allow clients to have tax returns prepared by a tax agent by visiting the tax agent at a retail office location, i.e., a traditional "brick and mortar" location. Typically this service requires the client print and bring in the client's tax documentation, which the tax agent then uses to complete a tax return on the client's behalf. The tax agent consultations or otherwise consults with the client as part of the preparation service to ensure that the tax return is accurately completed, while maximizing available tax breaks to minimize the client's tax liability. Once completed, the tax agent reviews the return with the client. The tax agent may also offer the client additional products and services, such as extended service guarantees or bank products. The client is asked to approve the return and pay for the service. Once the client pays the tax preparation fees and approves the return, the tax agent files the return on the client's behalf.

Many clients do not prefer the in-person interaction with the tax agent due to the scheduling limitations of the tax agent, the time to travel to and wait for the tax agent, and other preferences of the client. Therefore, the client may undertake to utilize tax preparation software that assists the client in the client preparing his/her tax return. However, many clients also do not like this self-preparation software, as it lacks the expertise of having a tax agent prepare the tax return. Such is even the case if the software provides access to a tax agent on a question-by-question basis. Even with software that includes this feature, the client is required to undertake formulating their questions and insuring that the tax agent has the relevant information. As can be appreciated, the difficulty in self-preparation of one's taxes is often that the taxpayer does not know the correct tax questions to ask or how their tax liability can be decreased or limited.

Accordingly, there is a need for a system, a computer program, and a method that allows the client to benefit from having a tax agent prepare the return while still not requiring the client to visit the tax agent. Moreover, there is a need for a system, a computer program, and a method that allows for an integrated, seamless tax consultation between the client and the tax agent that can be performed at the client's convenience and that provides documentation of the tax consultation.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

Embodiments of the present invention are a system, a computer program, and a method for performing consumer tax services via a online, real-time, and secure platform. More particularly, embodiments of the present invention provide for an online, real-time tax consultation for preparation of a client's taxes by a tax agent, wherein the tax agent is remote from the client, and the system is implemented via an electronic, online application accessible via a communications network. The system comprises a plurality of modules that are implemented via the computer program and that perform the steps of the method. Embodiments of the present invention broadly allow for a client desiring tax preparation of a tax return to initiate the tax preparation with a tax agent via an online platform; electronically upload or otherwise push the client's tax-related information and documents to the tax agent or allow the tax agent to pull the tax-related information and documents from sources of tax information; participate in an online tax consultation so that the tax agent may investigate, learn, or otherwise obtain the tax information necessary for completing the client's tax return; and electronically approve and file the completed tax return. The system broadly comprises a start-up module; a tax consultation module; a client module; a shared information module; a tax agent module; and a tax completion module. The start-up module includes a registration interface for receipt of minimal registration information from the client, and a scheduler interface for allowing the client to locate a tax agent for preparation of the client's taxes.

The tax consultation module allows for an online, real-time tax consultation between the client and the tax agent. The tax consultation module includes a multi-communication feed including an electronic chat interface for communication between the client and the tax agent during the tax consultation and via written word, and a conferencing feed for allowing the tax agent and the client to communicate via at least one of video and audio.

The client module presents a client view for display to and viewing by the client. The client module includes a tax information portal that includes at least one prompt for requesting the client to enter tax-related personal information.

The shared information module allows for electronic uploading of tax-related documents by the client for review by the tax agent and for review of tax forms by the client. The shared information module is further operable to electronically source tax-related information from the uploaded tax-related document and use the sourced tax-related information for completion of one or more tax forms.

The tax agent module presents a tax agent view for display to and viewing by the tax agent. The tax agent module includes a document review interface for allowing the tax agent to review, organize, and annotate the uploaded tax-related documents. Additionally, the document review interface allows the tax agent to post to the shared information module an at least partially completed tax return for review by the client prior to filing the tax return with a government taxing authority.

The tax completion module allows for receipt of an electronic signature of the client indicating approval of the tax return. The tax completion module also allows for receipt of payment from the client. Finally, the tax completion module is operable to electronically submit the tax return to the government taxing authority.

In further embodiments of the present invention, the system includes an operations module for operation oversight and management of the delivery of the consumer tax services via the online, real-time system. The system further includes a training module for tax agents to assist with training of the tax agent.

BRIEF DESCRIPTION OF THE DRAWINGS

Embodiments of the present invention are described in detail below with reference to the attached drawing figures, wherein:

FIGS. 4-12 are screen captures of a computer program of embodiments of the present invention.

Figure 1:
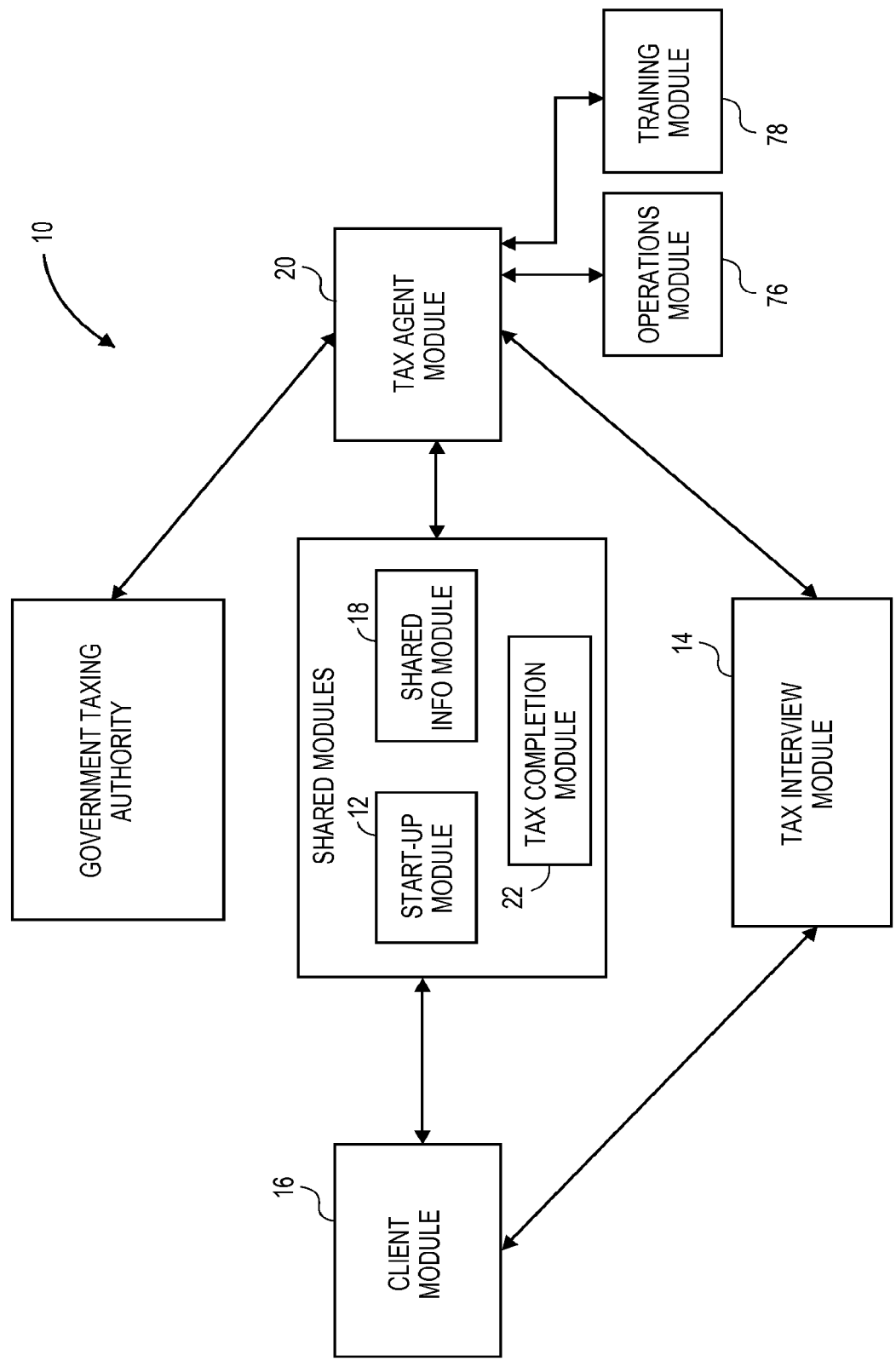
FIG. 1 is a block diagram illustrating a plurality of modules for performing an online, real-time tax consultation for preparation of a client's taxes according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention include a system 10, a computer program, and a method for delivering consumer tax services via an online, real-time, and secure (e.g., encrypted) platform. "Consumer tax services" comprises a plurality of varied services, including complete tax return preparation by a tax agent of a client's taxes; answering of tax-related questions, including for clients who prepare their own tax returns; reviewing a tax return prepared by the client or a third party; and reviewing of tax events that may affect the client's tax liability. The above list of consumer tax services is not intended to be exhaustive but rather exemplary of the types of consumer tax services that can be provided via embodiments of the present invention. For ease of reference herein, embodiments of the present invention will be described with respect to preparation of the client's tax return, although such should not be construed as limiting of the services delivered or available to be performed by embodiments of the present invention.

Further, as used herein, a "tax agent" is one who provides the consumer tax services to the client. In some embodiments, the tax agent is one who prepares one or more tax forms comprising a tax return for submission to a government taxing authority. In other embodiments, the tax agent may be one who answers the client's tax questions or assists the client in identifying and collecting tax-related documents. In even further embodiments, the tax agent may be one who manages or supervised other tax agents. Therefore, tax agent as used herein is intended to encompass any person that provides consumer tax services or any person or entity within an organization that provides consumer tax services. A "client" is one who is desiring the consumer tax service, such as assistance with or preparation of the tax return. In embodiments of the present invention, the client is an individual; however, alternative embodiments of the present invention allow for the client to be a business or small corporate entity.

As discussed in detail below, the system 10 is implemented across a communications network, such as the Internet, via a website or a stand-alone application, such as a mobile application. The system 10 comprises a plurality of modules that, when implemented, perform the steps of the method of embodiments of the present invention. The computer program of embodiments of the present invention comprises a plurality of executable code segments that perform the method steps. The system of the present invention will be broadly discussed herein with specific reference to the computer program and method as applicable. It is to be understood, however, that implementation of the system performs the method steps, as noted above.

Embodiments of the present invention broadly allow for a client desiring preparation of a tax return or delivery of another consumer tax service to initiate the tax preparation with a tax agent via an online platform; electronically upload or otherwise push the client's tax-related information and documents to the tax agent or allow the tax agent to pull the tax-related information and documents from sources of tax information; participate in an online tax consultation so that the tax agent may investigate, learn, or otherwise obtain the tax information necessary for completing the client's tax return; and electronically approve and file the completed tax return. The tax preparation can be performed entirely electronically, such that the client is remote from the tax agent. In embodiments of the present invention, the computer program is accessible via any Internet-enabled computing device, including a PC or a laptop or any mobile communications device, such as a tablet or smartphone. The system of embodiments of the present invention is fully integrated into a single platform or application, such that the computing device used by the client and/or the tax agent to perform the steps of embodiments of the present invention does not require additional specialized software or applications, beyond the computer program of the present invention and well-known multimedia programs, such as FLASH™.

System Module Description:

As noted above, the system 10 includes a plurality of modules broadly comprising a start-up module 12; a tax consultation module 14; a client module 16; a shared information module 18; a tax agent module 20; and a tax completion module 22. In further embodiments of the present invention, the system 10 includes an operations module 76 and a training module 78, discussed in further detail below. The client module 16 and tax agent module 20 communicate via the tax consultation module 14. Some of the modules comprise shared modules, such as the start-up module 12, the shared information module 18, and the tax completion module 22. In these shared modules, information is passed between the client and the tax agent to assist in preparation of the tax return.

As discussed in detail below, each module performs a variety of functions and steps implemented via a plurality of executable code segments stored on a non-transitory computer-readable medium. The information provided during the tax consultation discussed herein (e.g., the below-discussed multi-communication and conferencing feeds and the tax-related documents) is stored and retrievable by both the client and the tax agent.

The start-up module 12 includes a registration interface 24 and a scheduler interface 26. In embodiments of the present invention, upon the client accessing the computer program, the client is directed to the home or start-up screen introducing the client to the online tax preparation application. As used herein, "screen" encompasses a visual window, including a pop-up window, that may have a plurality of graphical objects, including hyperlinks, selectable icons, toolbars, controls, or other similar objects, for navigating a user to functions or processes performed by the computer program of embodiments of the present invention. The screen may further be an input receipt screen for receiving information inputted by the user, including a text box for receiving typed text, a selectable icon, or receipt of gestures by the user, such as swiping, pinching, or other similar input methods.

Figure 4:
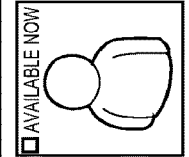

Upon the client indicating interest in beginning a tax preparation session, such as by selecting an icon labeled "Begin a Tax Return," a registration interface 24 is presented to the client, as illustrated in FIG. 4. The registration interface 24 requests minimal registration information from the client so as to assist the system in identifying or locating a tax agent knowledgeable regarding any specific expertise required for preparation of the client's tax return. The minimal registration information includes a zip code or other geographical information for the client and an identification of the needed expertise for the client. A pop-up window is presented to the client to input the zip code and to select one or more expertise requirements, such as investments, military personnel as wage earners, loss from disaster or theft, etc. In even further embodiments of the present invention, the needed expertise for the client may include a particular language spoken by the tax agent so that the client and tax agent may more easily communicate.

Should the client have accessed the system 10 of the present invention for prior tax years, the system stores the client's tax-related information for use in subsequent years, as further discussed below. Therefore, in some circumstances, the client may need not enter minimal registration information to begin the tax consultation. Instead, the client may enter account information, such as username and password, associated with the client's account. The system 10 then retrieves the stored information for the client and uses the information for beginning the present year's tax consultation.

To facilitate matching of the client with a tax agent having the necessary expertise, the expertise or credentials for each tax agent are known and stored by the system. Upon receipt from the client of the required expertise, the system 10 locates tax agents with the indicated expertise. As will be discussed below with respect to the computer program of embodiments of the present invention, the expertise of the tax agents and other data for storage and retrieval by the system 10 are managed via a relational database management system ("RDMS") or other database management system, as is known in the art.

The scheduler interface 26 of the start-up module 12 allows the client to locate or search for a tax agent based on a variety of preferred criteria, including a tax agent having the indicated expertise and that is presently available, a tax agent having the indicated expertise and for which an appointment for a tax consultation can be scheduled, and a specific tax agent as indicated by the client. Moreover, in embodiments of the present invention, the scheduler interface 26 locates tax agents based on criteria including the geographic proximity of the tax agent to the client. In determining the geographic proximity of the tax agent to the client, the location of the tax agent is known and stored by the system, and this location is compared to the client's location provided via receipt of the client's zip code. In alternative embodiments of the present invention, the location of the client may be known based on a GPS system 80 or other tracking system associated with the client device 54, including the client's mobile communications device. As such, the system 10 may be operable to automatically receive the client's location and input the location (either by zip code or other preferred identifier) into the system 10 for locating of and matching with the tax agent.

It should be understood that the system 10 can rank the criteria for the tax agent according to any preferred ranking metric. For example, the system 10 could first filter the tax agents for matching with the client based on the known languages of the tax agent, then based on the tax-related expertise of the agent, and then based on the agent's geographical proximity. Other ranking filters and metrics could also be applied.

As illustrated in the screen capture of FIG. 5, the system 10 allows the client to select the "available now" tax agents based on the closest geographic proximity to the client. If there are no available tax agents within a select proximity, such as one hundred miles, then the available tax agents within the client's state are identified. If there are no available tax agents within the client's state, then tax agents available nationally with the required expertise to prepare the client's state tax return are identified. As can be appreciated, other criteria for identification and selection of a tax agent for the particular requirements of the client can be used. However, most tax agents will be matched with the client based on tax-related expertise, language expertise, geographic proximity to the client (including whether the tax agent is qualified for preparing the state tax return), and the client's preferred availability of the tax agent (i.e., client prefers a tax agent that is presently available for the tax consultation versus scheduling an appointment with the tax agent).

Figure 6:
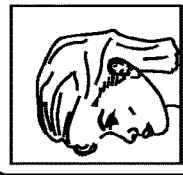

Should the client choose to make an appointment with the tax agent, the client can select a "Find a Specific Tax Pro" tab 28 and schedule an appointment, as illustrated in the screen capture of FIG. 6. Regardless of the client searching for tax agents currently available versus scheduling a tax consultation, once the system 10 narrows the tax agents based on the client's criteria to a set list, the tax agents are listed for the client to view and select, as illustrated in the screen captures of FIGS. 5 and 6. An icon or other visual indicator may be displayed next to each tax agent's listing to indicate the agent's current availability (e.g., online, offline, with another customer, etc.). The client may obtain even further information regarding a particular tax agent by selecting to review the agent's profile link 30. The profile information may include the experience of the tax agent, the location of the agent, language(s) spoken by the tax agent, and other curriculum vitae information helpful for selection by the client. The listing of the tax agents may also include a photograph 32 of each agent.

Once the client has selected the tax agent, a tax consultation session is started via the tax consultation module 14. Referring to the screen capture of FIG. 7, the tax consultation is held between the client and the tax agent in real-time and completely online (with the exception of an audio connection, as discussed below). In alternative embodiments, some aspects of the tax consultation may be in-person based on a preference of the client.

Figure 7:
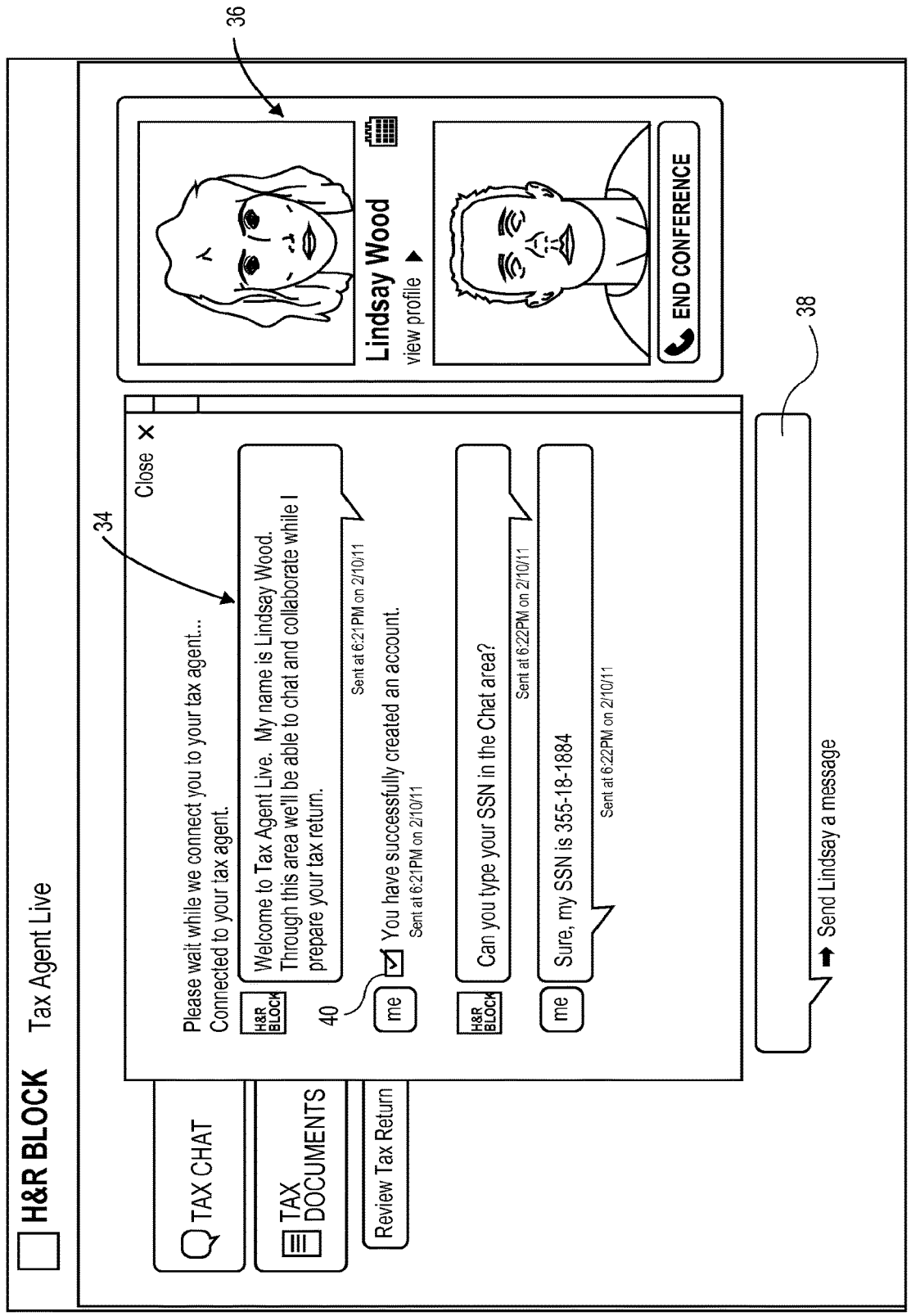

The tax consultation module 14 includes a multi-communication feed 34 and a conferencing feed 36. In embodiments of the present invention, the multi-communication feed 34 is an electronic chat interface accessible to both the client and the tax agent for communication between the parties during the tax consultation. The chat interface comprises a chat feed, as illustrated in FIG. 7, through which either party may communicate with the other party via the written word, i.e., by typing the communication into an input box 38. In embodiments of the present invention, the multi-communication feed 34 includes a language translator for automatically translating any text typed by either of the tax agent and client to a preferred language of the recipient of the translated text.

Within the chat feed, the chat interface may also include changeable icons 40 that indicate when certain tasks have been performed. Thus, for example, in the screen capture of FIG. 7, upon the client creating an account, the chat interface may automatically provide an indication in the chat feed that the account creation step is complete. In embodiments of the present invention, the completion of tasks necessary for preparing the client's tax return may be viewable by the parties and automatically updated by the system 10. For example and as discussed in more detail below, upon uploading by the client of his/her W-2, the system may note that receipt of the W-2 is complete and automatically update both the client and tax agent of such. Additionally, the tax agent may manually indicate completion of a task, upon which the system automatically updates the client that such task is complete.

The multi-communication feed 34 is preferably stored by the system 10 and retrievable by the other party in its entirety. This allows either party to have a record of the discussion between the parties and to review the information provided therein. Moreover, the multi-communication 34 feed is also text, date, or other parameter-searchable to allow either party to quickly locate a particular discussion topic.

Although the multi-communication feed 34 has been specifically discussed with respect to a chat interface, the multi-communication feed 34 also encompasses other modes of electronic communication between the tax agent and the client. For example, the multi-communication feed 34 includes any e-mails, texts, and telephone calls sent from one of the parties to the other party. Further, the multi-communication feed 34 encompasses status updates automatically generated by the system 10 or initiated by the tax agent. As also discussed below, these status updates are automatically generated by the system upon completion of a certain task, such as receipt of particular financial information or confirmation that the tax return has been accepted by the government taxing authority. The status update is sent to the client module 16 via the system 10. In alternative embodiments, the status update or notice of the status update (i.e., an indication to the client that he/she should access the system 10 for the status update) is communicated via the multi-communication feed 34 to the client via text, e-mail, or other preferred electronic communication mode.

The conferencing feed 36 of the tax consultation module 14 allows for the client and the tax agent to perform the tax consultation via a video conference (including either or both of video and audio and either or both of the tax agent and the client), via an audio-only connection, or via a video connection that is optionally followed by a telephone call. When using the video conference option, the client may selectively choose to be visible to the tax agent, such that the client and the tax agent are both viewed in a pane on the respective party's display. Alternatively, if the client prefers to have no video connection (or the client does not have a webcam), the client can choose to have an audio-only connection through a suitable communications network. In embodiments of the present invention, the conferencing feed 36 is viewable by the parties at all times during the tax consultation or at the selection of the client. Similar to the multi-communication feed 34, the conferencing feed 36 may also stored by the system 10 and retrievable by either party in alternative embodiments of the present invention.

The client module 16 of embodiments of the present invention presents a client view that is specific to the client and different from the display for the tax agent. The client module 16 includes a client account interface for creation of a client account, a tax information portal 42 for entering of tax-related personal information, and a checklist for action items or tasks (both completed and to be completed). In embodiments of the present invention, the client account interface and the tax information portal 42 may be the same interface/screen(s).

As discussed above, prior to beginning the tax consultation, the client is requested to provide minimal registration information to assist in matching the client with a particular tax agent. In embodiments of the present invention, additional tax-related personal information is needed from the client to complete preparation of the tax return. As such, the client module 16 includes the client account interface and the tax information portal 42 to prompt the client for and to receive the additional tax-related information. Alternatively, the system 10 of embodiments of the present invention could be implemented where the client account is created prior to beginning the tax consultation and prior to matching the client with a tax agent, or the tax-related personal information could be obtained earlier in the consultation process. For example, in embodiments of the present invention, the checklist of tax-related documents needed for preparation of the tax return is provided at the beginning of the tax consultation and generally contemporaneously with receiving the minimal registration information from the client. Thus, it is to be understood that certain information is required from the client to begin and complete the tax consultation and tax preparation process. This information can be collected from the client piecemeal or collectively at the same time and could be collected at varying times during the tax preparation session, including during the tax consultation.

It should also be understood that in some instances, the client may be confirming or validating previously-stored tax-related information. Thus, as used herein, "entering" of tax-related information by the client encompasses manual entry of the information and/or confirming the accuracy of the information, editing the information, or validating the information, including previously-stored or entered information, and "receipt" of the tax-related information by the system 10 encompasses the above-described "entering" steps by the client.

Figure 8:
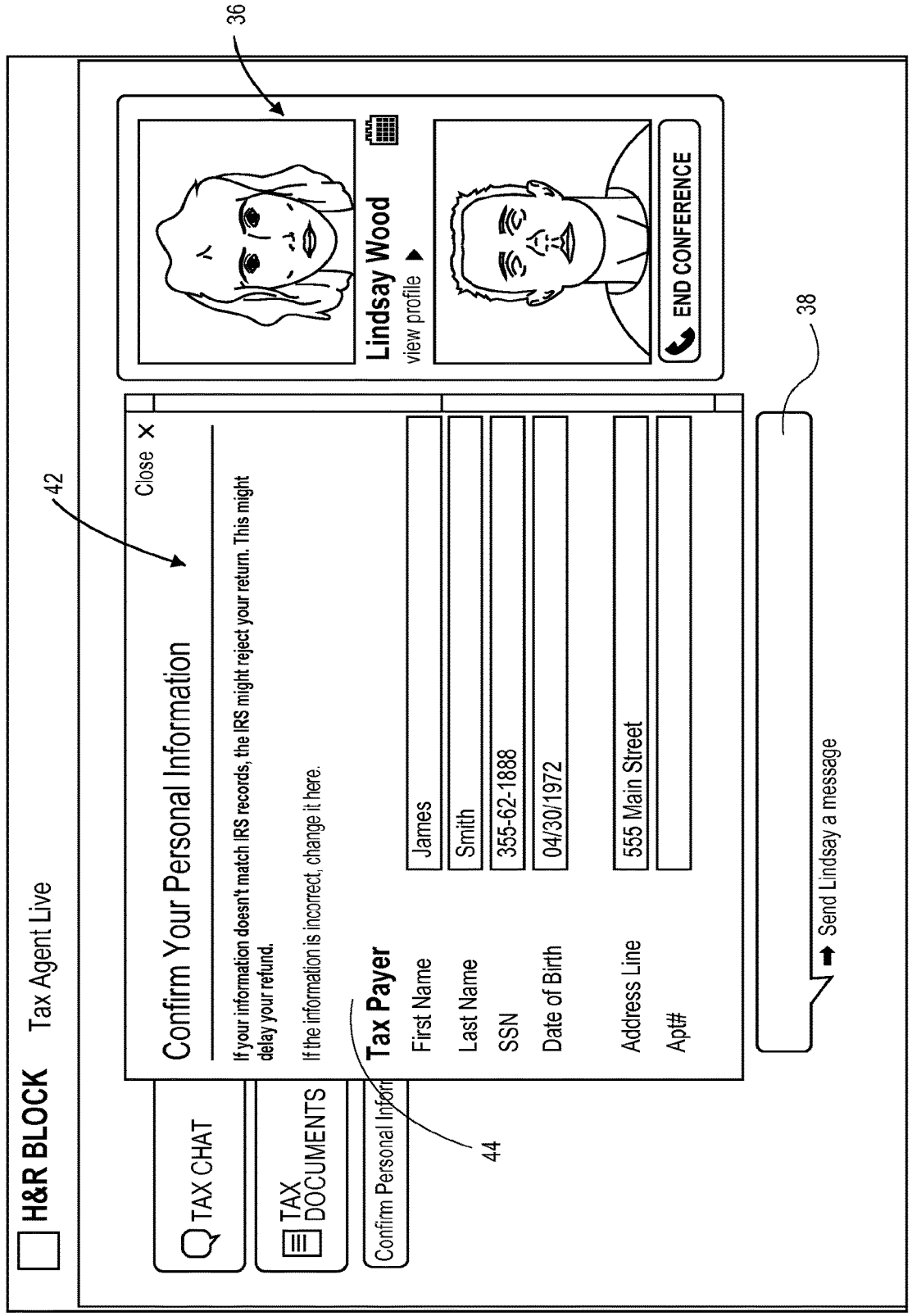

Referring to FIG. 8, a pop-up screen 44 is presented to the client in the tax information portal 42 for receipt of the client's tax-related personal information, such as full name, Social Security Number, address, etc. In embodiments of the present invention, the information inputted by the client is automatically entered on one or more tax forms prepared as a result of the tax consultation. Thus, inputting of the information by the client reduces the need for the tax agent to manually input the information, which further reduces input or transcription errors. Alternatively, as illustrated in FIG. 7, the tax agent could specifically request certain tax-related personal information, such as the client's Social Security Number, via the multi-communication feed 34 or via the audio connection from the conferencing feed 36. In even further embodiments of the present invention, upon the client entering information having known forms, such as a nine-digit Social Security Number, into the chat feed, the system automatically recognizes the form of the text entry as a Social Security Number and in turn, automatically enters this information on one or more tax forms.

In embodiments of the present invention, the client view in the client module 16 includes the checklist for action items or tasks (both completed and to be completed). The checklist is automatically updated by the system 10 upon completion of the particular task. In alternative variations and as discussed above, the multi-communication feed 34 indicates completion of a task, as illustrated in FIG. 7. The checklist may be accessed by the client at any time so that the client can determine what tasks have been completed and what tasks still need to be completed. Exemplary tasks include uploading of the necessary tax-related documents, as described below, receipt of all necessary tax-related personal information from the client, completion of the tax return or tax forms, approval of the tax return/forms by the client, payment by the client for the tax preparation, and submission of the tax return/forms to the appropriate government taxing authority. As discussed above, the system may automatically update a particular task upon determining the task is complete, such as receipt of the client's W-2 or receipt of the client's payment. Alternatively, the tax agent may manually select that a task is complete.

The shared information module 18 of embodiments of the present invention provides for electronic uploading of tax-related documents by the client for review by the tax agent, electronic sharing of the documents, and review by the client of tax forms or completed tax return data prepared by the tax agent. The shared information module 18 essentially allows for uploading, pulling, or otherwise pushing to the system 10, and for selectively pushing to the parties, the tax-related documents, tax forms, and the completed tax return data.

In more detail, it is well-known that the client is provided with many tax-related documents that must in turn be provided to the tax agent for preparation of the tax return. Depending on the client, the client's employer, and any other companies from which the client receives tax-related documents, said documents may be provided to the client in-person, via regular mail, electronically provided, or downloadable from the company's website. Embodiments of the present invention provide for uploading of the documents in an electronic format, such as a .pdf, .doc, JPEG, etc.

"Uploading" of the documents as described herein includes the client manually uploading a document to the system 10, the client instructing that the document be electronically pushed to the system 10 of the present invention, or the tax agent pulling the document from a source of tax-related documents for the client, including the client's payroll provider, the client's financial management software, the client's mortgage company, and other known sources. For example, the client can request or select that a digital copy of the document held at a third-party source, such as the client's banking website, be electronically sent to the system of the present invention. In instances where the client does not have a digital copy of a document, the client can fax, e-mail, or regular mail copies of the tax-related document to the tax agent, or the client can drop off the tax-related documents at the tax agent's office or place of business. As also described below, the client can take a digital photograph of the document, such as with the client's mobile communications device, and upload the photograph of the document to the system 10. In even further embodiments, "uploading" of the document can encompass the client and/or tax agent holding the document up to a webcam associated with the client/tax agent device 54,56 so that the other party can view the document.

In embodiments of the present invention, the shared information module 18 includes a listing for review by the client of common tax-related documents. This listing identifies for the client documents that the client needs to obtain for the tax preparation session. As noted above, the listing may also be provided to the client at the beginning of the tax consultation generally contemporaneously with receiving the minimal registration information from the client. The client may then upload the documents to the shared information module 18. The client may upload the documents prior to beginning the tax preparation session with the agent, if preferred. The listing includes a reference and selectable link to a particular tax-related document, such as a W-2. The client then selects the link to the particular document to perform the uploading to the shared information module 18. The module electronically stores the documents in a secure database or vault that is accessible by the client and the tax agent at any time and for a year to several years subsequent to the current tax year. In circumstances where the client prefers to have the document pushed to the shared information module 18 from a third party, the shared information module is operable to recognize the type of document (e.g., W-2, 1099, etc.) and the client for whom the document pertains. In even further embodiments of the present invention, the client may take a digital photograph of the document and upload the photograph to the shared information module 18. The module will then identify or label the uploaded photograph as the appropriate document and further electronically source the photograph, as described below.

In alternative embodiments of the invention, the system 10 may allow the tax agent limited access to the client's financial management software and financial accounts to obtain the necessary documentation and information for preparing and completing the tax return. For example, if the client has an online or Internet-accessible bank account, the client may establish preferences within its account for the tax agent to access, download, or otherwise retrieve or pull certain items of information or tax-related documents. The system 10 then automatically pulls the necessary documents and information from the client's third-party financial sources and populates the tax return as appropriate. This relieves the client from pushing or otherwise uploading the documents to the system 10.

In embodiments of the present invention, the shared information module 18 is operable to electronically source tax-related information from the uploaded tax-related document (or photograph, as the case may be) and use the sourced tax-related information for completion of one or more tax forms. "Electronic sourcing" as used herein defines any process for electronically translating a document, regardless of file type, to obtain from the document the content provided thereon. Exemplary electronic sourcing processes include optical character recognition ("OCR"), optical word recognition ("OWR"), intelligent character recognition, and other similar forms of electronic character recognition. Electronic sourcing is not necessarily limited to text (handwritten or typed) but can further include bar codes, QR codes, or other non-text matrix codes provided on the document and that are machine readable.

Upon electronically sourcing the information on the tax-related documents, including, for example, electronically translating the text on the documents into machine readable form, the shared information module 18 is operable to use the sourced information on the forms for completion of the tax return. In particular, the shared information module 18 is operable to automatically fill-in the tax return or input the information on the forms, as appropriate. Alternatively, the shared information module 18 can input the information into a tax calculator used by the tax agent for preparation of the tax form. In embodiments of the present invention, the shared information module 18 automatically categorizes or otherwise organizes the information obtained from the documents and provides the information to the tax agent in an organized, easily-useable manner. At any time, both during and outside the tax consultation, the client and the tax agent can select and view any document.

It is noted that embodiments of the present invention are described with respect to preparing or completing a tax form or return. The tax form or return should not be construed to only cover a pre-set form that is often used by government taxing authorities, such as a Form 1040 used by the U.S. Internal Revenue Service. Instead, a tax form or return also encompasses the completed tax data that is sent to the government taxing authority by the tax agent for serving as the client's completed "tax return." In particular, the electronic submission of a "tax return" by a tax agent often encompasses submission of the completed tax data, as opposed to submission of a tax return form, such as a 1040. Therefore, reference to completing the tax form or return herein also encompasses preparation, completion, or compilation of the relevant tax data corresponding to the client's tax return.

The tax agent module 20 of embodiments of the present invention presents the tax agent view specific to the tax agent. In particular, each tax agent may adjust the tax agent view according to their preferences. However, it is foreseen that most tax agents will want to view the multi-communication feed 34, the conferencing feed 36, the list of uploaded documents, and at least some of the client's tax-related personal information. In alternative embodiments of the present invention, the tax agent view may also include a checklist, similar to the checklist provided in the client view, to indicate completion of various tasks or selection of uploaded documents. The checklist in the tax agent view may be helpful to the tax agent to provide a quick reference of what tasks the client has completed (e.g., uploading of the necessary tax-related documents).

In embodiments of the present invention, the tax agent module 20 includes a document review interface for allowing the tax agent to review, organize, and annotate the uploaded tax-related documents. The tax agent may select a document from the list of uploaded documents. Upon selection, the document will be presented to the tax agent in the tax agent view. The tax agent may review the document for the necessary information. Additionally, the tax agent may mark, tag, or otherwise electronically and non-destructively annotate the document using a plurality of annotation programs provided in the tax agent view. Exemplary annotation programs include highlighting, inserting a comment or text box on the document, and otherwise electronically marking the document. The tax agent's annotations are stored with the document, so that the tax agent can view the document with or without the annotations. In embodiments of the present invention, the client is restricted from viewing the annotations, although this could be modified based on user preferences. In even further alternative embodiments of the present invention, the tax agent may identify a particular annotation as being acceptable for viewing by the client, such that the tax agent may selectively choose what annotations the client can view.

In embodiments of the present invention, the tax agent can select a document for viewing by the client, such that the document is being reviewed simultaneously by the client and the tax agent in the shared information module 18. In this embodiment, at least a portion of the windows for each of the client's and tax agent's views is a shared view, such that anything presented, uploaded, or otherwise placed in the shared view is viewable by both parties. In the shared view, the tax agent can annotate the document "on-the-fly" or in real-time, such that the tax agent can perform the annotations while discussing the same with the client via the conferencing feed 36. The client would then be able to see the annotations and quickly understand or appreciate the discussion topic. Alternatively, the tax agent may point to or select particular items of information on the document for discussion. In even further alternatives, the user preferences may be set so that the client can annotate the document, such that the client view also includes one or more annotation programs.

Figure 9:
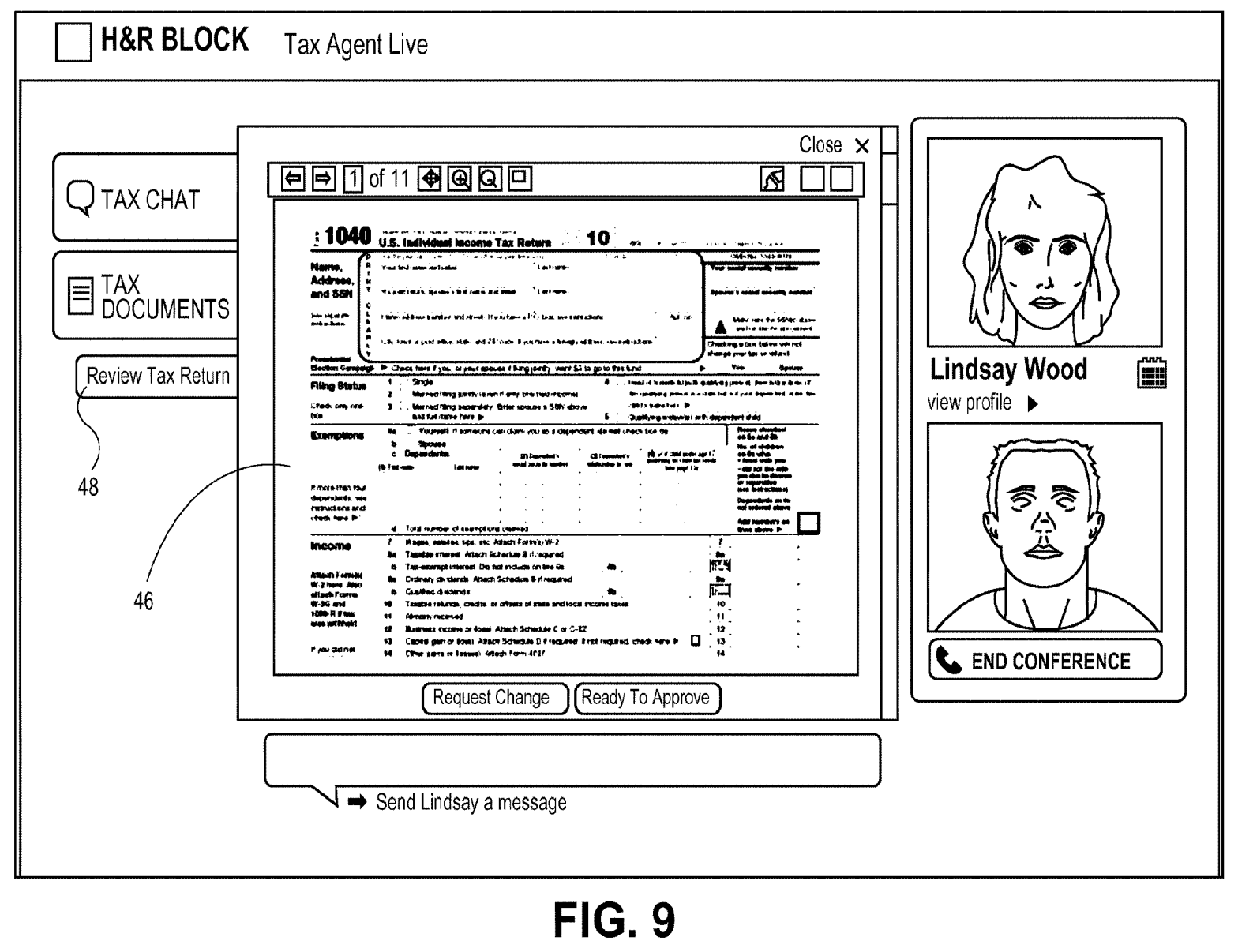

The tax agent may also use the document review interface to post to the shared information module 18 at least partially completed tax forms for review by the client prior to filing or submitting said tax forms with the appropriate government taxing authority. For example, after the tax agent has completed a particular tax form, the tax agent may post or otherwise make accessible the completed tax form 46 to the shared information module 18. The client would then be able to view the document in one of the client or shared views, as illustrated in the screen capture of FIG. 9 (illustrating the client view of a completed tax form).

Figure 12:
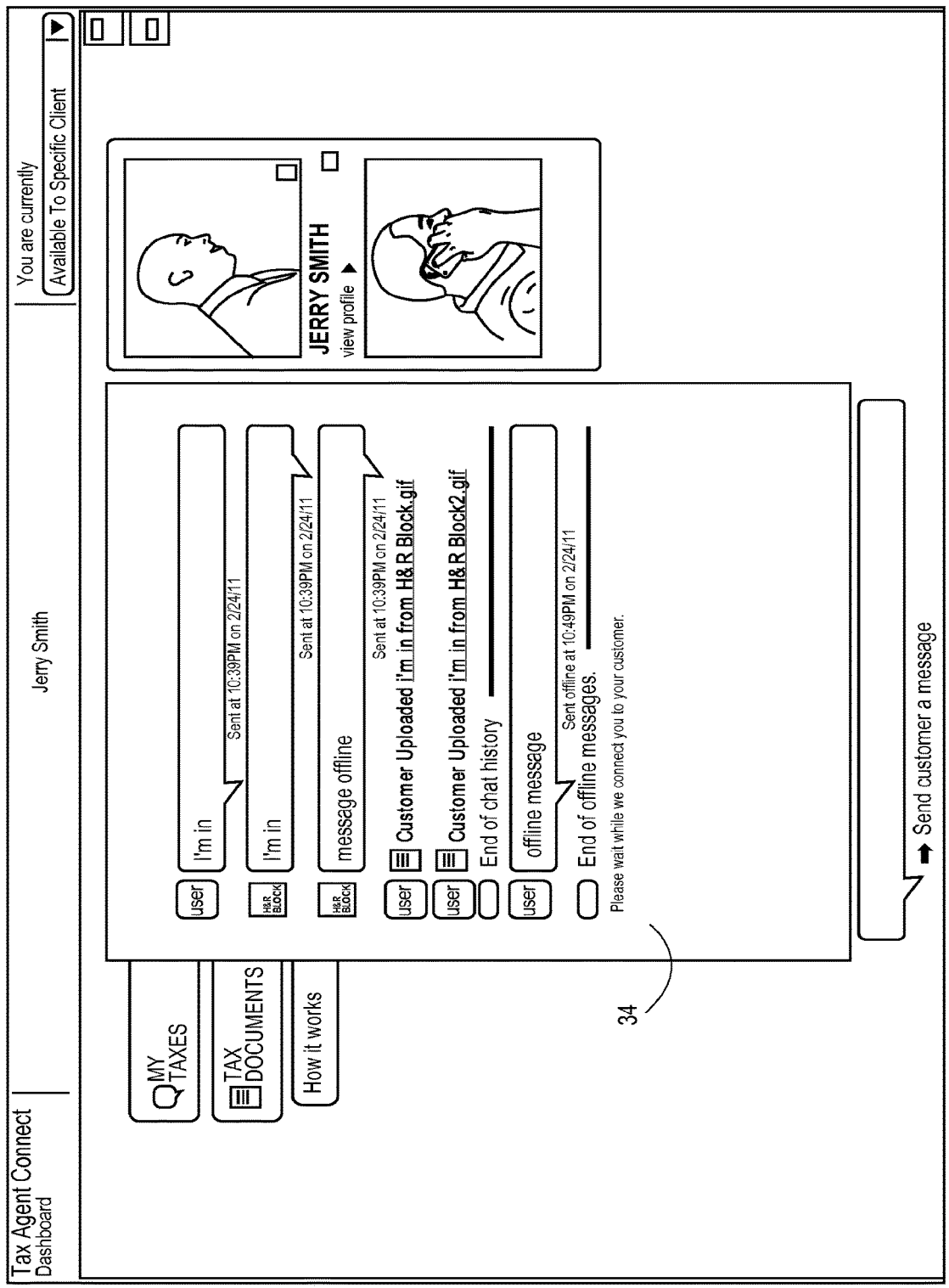

As discussed above, the client view varies from the tax agent view. This further applies to the multi-communication feed 34, wherein the multi-communication feed 34 in the client view for the client module 16 may be different than the multi-communication feed 34 in the tax agent view for the tax agent module 20. As illustrated in FIG. 12, the multi-communication feed 34 may include a notation that certain documents have been uploaded or may automatically update the tax agent with completed tasks.

Figure 10:
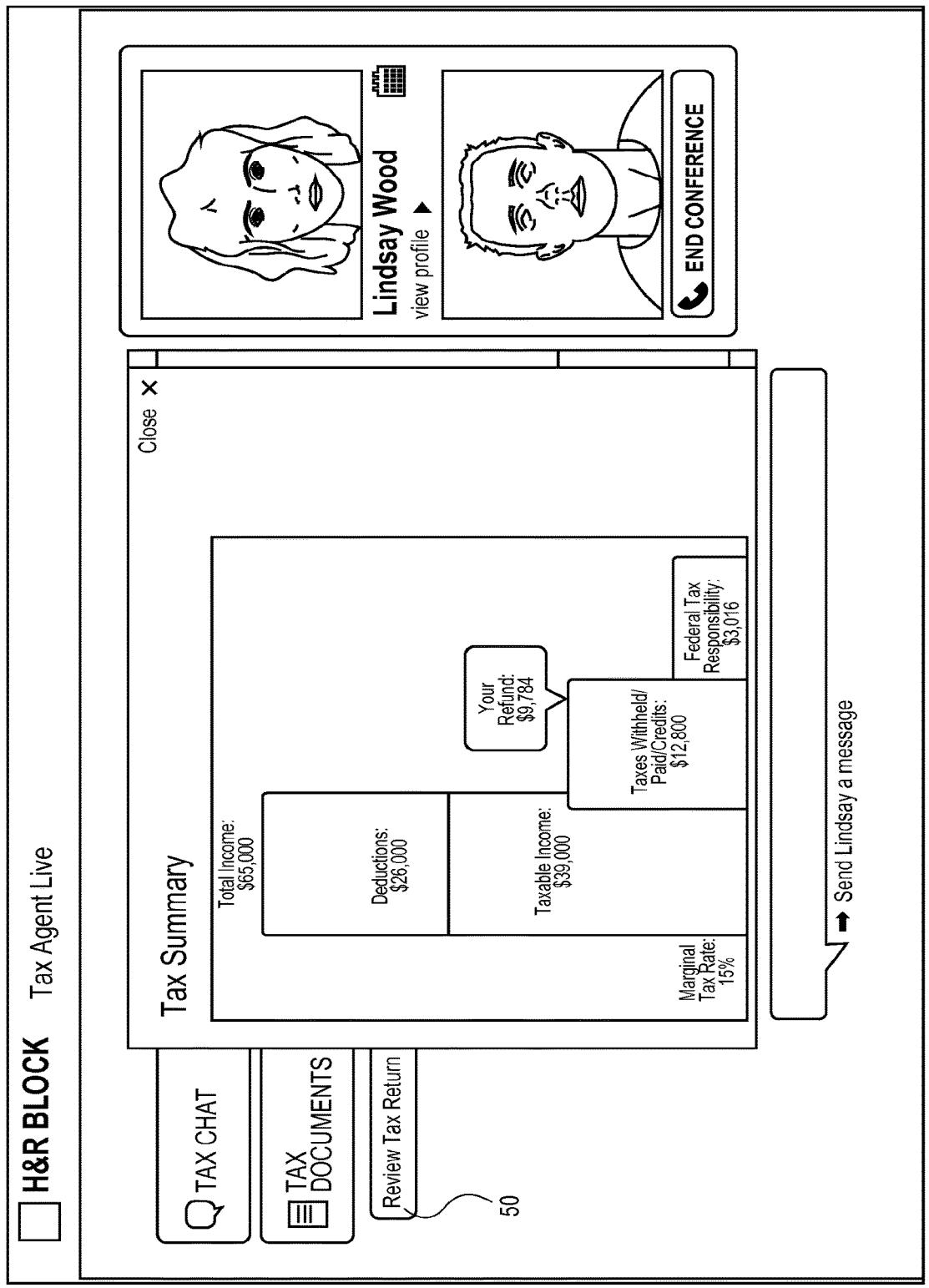

The tax completion module 22 is the final component of the system 10 of embodiments of the present invention and allows for receipt of the client's approval of the tax return/forms (including the prepared tax return data, as discussed above), for receipt of an electronic signature of the client, for receipt of payment for the tax return preparation, for receipt of bank information for withdrawal of a payment to the government taxing authority or for depositing of a tax refund, and for electronic submission of the completed tax return/form. Once the tax agent has completed preparation of the client's tax return/forms, the tax agent submits an indication of such to the system 10, which then in turn notifies the client of the completed return, such as via an e-mail, text, phone call, or as a posting on the client view. The client may review the tax return/form and any accompanying documents by selecting a labeled tab, link, or icon 48 on the client view, such as "Review Tax Return." In embodiments of the present invention, the client is provided with a summary in the client view of the client's taxes for the tax year, as illustrated in the screen capture of FIG. 10. The client may access the summary view by selecting a labeled tab, link, or icon 50 in the client view.

Figure 11:
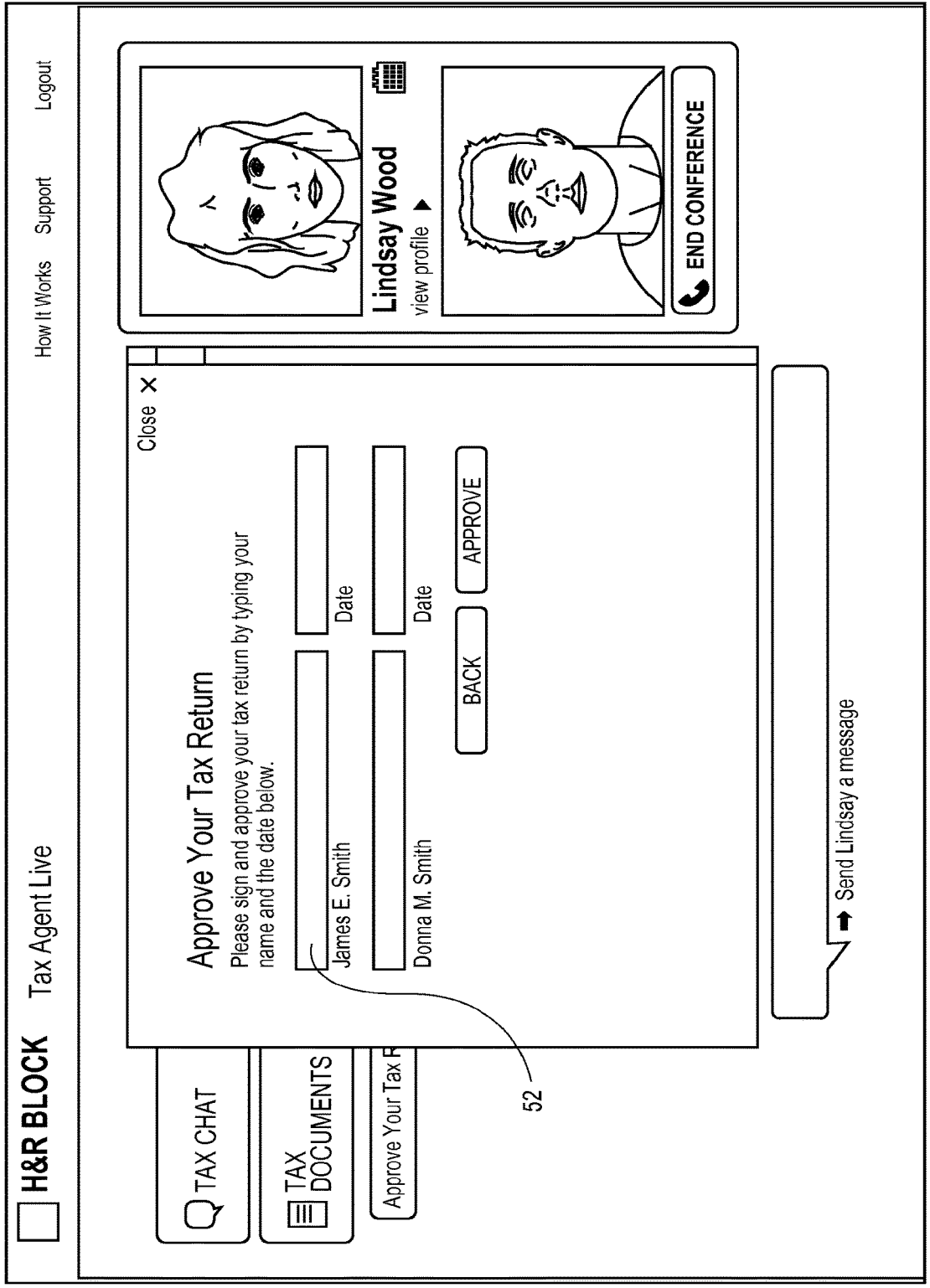

To confirm the client's approval of the tax return/form, the system 10 prompts the client to approve the return and/or otherwise provide the client's electronic signature 52, as illustrated in the screen capture of FIG. 11. In embodiments of the present invention, the electronic signature of the client may be the same as or otherwise indicate the client's approval of the tax return/forms. The electronic signature of the client may be a marking or checking of a box or providing of other input to the system 10 by the client and indicating the client's signature. The client's electronic signature 52 may be the client's typed name in an input box, the client's biometric indicia, such as a fingerprint, or receipt of an electronic, handwritten signature provided by the client on an electronic signature pad. In embodiments of the present invention, the checklist provided in the tax agent's view is updated to include receipt of the client's approval, or the tax agent is otherwise informed of the client's approval.

The tax completion module 22 also provides for receipt of a payment from the client for preparation of the tax return. In embodiments of the present invention, after, before, or generally contemporaneously with the client approving the tax return/forms, the client is provided with a payment input screen in the client view. The client can select payment by known methods, including a debit or credit card. At this time, the system 10 also requests whether the client wants to receive any tax refund electronically and obtains the necessary banking information. In alternative embodiments of the present invention, the client may also be presented with other financial offerings, such as receipt of a refund anticipation check as opposed to direct deposit of the tax refund in the client's bank account or a choice to receive a refund on a prepaid card. Should the client owe a payment to the government taxing authority, the tax completion module requests the client provide its preferred form of payment (e.g., send a check or other direct payment to the taxing authority or automatic withdrawal from the client's bank account) and the appropriate information for completing the form of payment (e.g., the bank account information).

Upon receipt of the client's payment, the system 10 submits the client's tax return/forms (or completed tax return data, as the case may be) to the appropriate government taxing authority. If the taxing authority accepts electronic submissions, the system attends to electronic submission of the tax return/forms. The system 10 provides a communication to the client, such as via e-mail, text, telephone call, or a posting on the client view, once the government taxing authority has confirmed receipt and approval or rejection of the submitted tax return/forms. The client may access his/her account and view, download, or print the client's tax return/forms.

It is contemplated that the tax consultation may be held over one or more tax preparation sessions. For example, if the client has not collected all of the relevant tax-related documents, the client may need to schedule another tax session. The system 10 of the present invention allows the client to access the client's account via known methods, such as providing the client's account information (e.g., username and password). Embodiments of the present invention also allow for the client to schedule with the tax agent a tax session at a specific time. The system further allows the tax agent and the client to pass information between them without necessarily requiring a real-time connection of the two parties at every point. In embodiments of the present invention, the client and the tax agent may communicate offline via text messages, e-mail, telephone, or other preferred mode of communication. For example, the client may choose to drop off relevant tax-related documents at the tax agent's office or place of business. Therefore, it is contemplated that not all interaction between the tax agent and the client will be via the online platform described herein, depending on the preferences of the client.

In even further alternative embodiments of the present invention, the client may choose to extend the tax consultation over multiple sessions and work with the first available tax agent during each session, such that the same tax agent is not used for the entirety of the tax consultation. In this example, due to the uniformity of the tax agent view and the ability to review previous multi-communication feeds and the automatically-updated checklist, a tax agent who has not yet worked with the client (i.e., who enters the tax consultation "in the middle" of the tax consultation) can quickly come "up to speed" and learn about the particular client's tax situation. In embodiments of the present invention, the system stores the information associated with the client's account (e.g., multi-communication feed, checklists, client's completed tax returns/forms) for several months to several years for future access of the information. This is also advantageous because it provides documentation of the tax consultation that may be helpful to one or both of the client and the tax agent should the client ever be audited or should the tax agent's advice ever be adjudged.

Embodiments of the present invention also include the operations module 76 and/or the training module 78. The operations module 76 allows for operational oversight and management of the delivery of the consumer tax services. This is advantageous for instances where a particular consumer tax services provider has numerous tax agents located at multiple locations, including multiple offices, spread across a large geographic region. The operations module 76 provides for one or more tax agents, whether centralized or decentralized, to monitor the status of and take any needed actions regarding an individual client's interactions with the tax agent and preparation of the client's tax return.

Features of the operations module 76 include providing statistical information of the total client volume for a particular tax agent, for a particular office providing consumer tax services, and nationally. The module 76 is also operable to track client selection preferences, such as the criteria used by one or more clients for selection of a tax agent, the preferred expertise for the tax agents, the state(s) in which clients are located and seeking tax agents, and whether the tax agent is available now versus available via appointment.

The module 76 also monitors, tracks, and flags for follow-up the time since an interaction between the client and the tax agent, such as the time when the parties last communicated and/or the time since the client last accessed his/her account. The module 76 also monitors whether a tax return that has been started has been completed, paid for by the client, and filed with the appropriate government taxing authority. The module 76 can also monitor the number of online clients and tax agents at a present time, including the number of scheduled appointments, and how many client accounts have been created, and of those created, the number of tax returns completed (including the ratio or conversion percentage between clients who begin but do not complete a tax return). The module 76 can survey clients and obtain information regarding their satisfaction level with the provided consumer tax services and with the particular tax agent, the agent's office, and any other similar information. The operations module 76 could also include a customer support function that provides tax agent supervisors increased security settings or preferences to access, review, monitor, revise, or otherwise address concerns with a particular client's tax return.

The training module 78 enables a tax agent to take a web-based training course to develop awareness and knowledge of the system 10 of embodiments of the present invention so as to best service the clients. The training module 78 is operable to train the agent how to fully use of the system 10, including allowing the tax agent to practice preparing tax returns via the system 10 in a training environment. The training module 78 pairs the trainee tax agent with other tax agents or dedicated training personnel to complete online role-play exercises that simulate servicing the client through the platform of the system 10 of the present invention. Additionally, tax agents may take certification tests through the training module 78 that verify satisfactory development of the necessary stills to service clients via the system 10. The training module 78 is operable to track the tax agent's training and progress in completing the necessary training courses, and, in some embodiments, will automatically on-board or "turn on" the tax agent's account so as to service the client once the agent's training is completed.

It is to be understood that the functions and operations performed by the various modules described herein can be performed out of order (unless otherwise stated). Moreover, a function being described as specific to one module could be performed by another module without deviating from the scope of the invention. The naming of the modules is for ease of reference only and should not be construed to limit the particular function or operation of a module.

Figure 2:
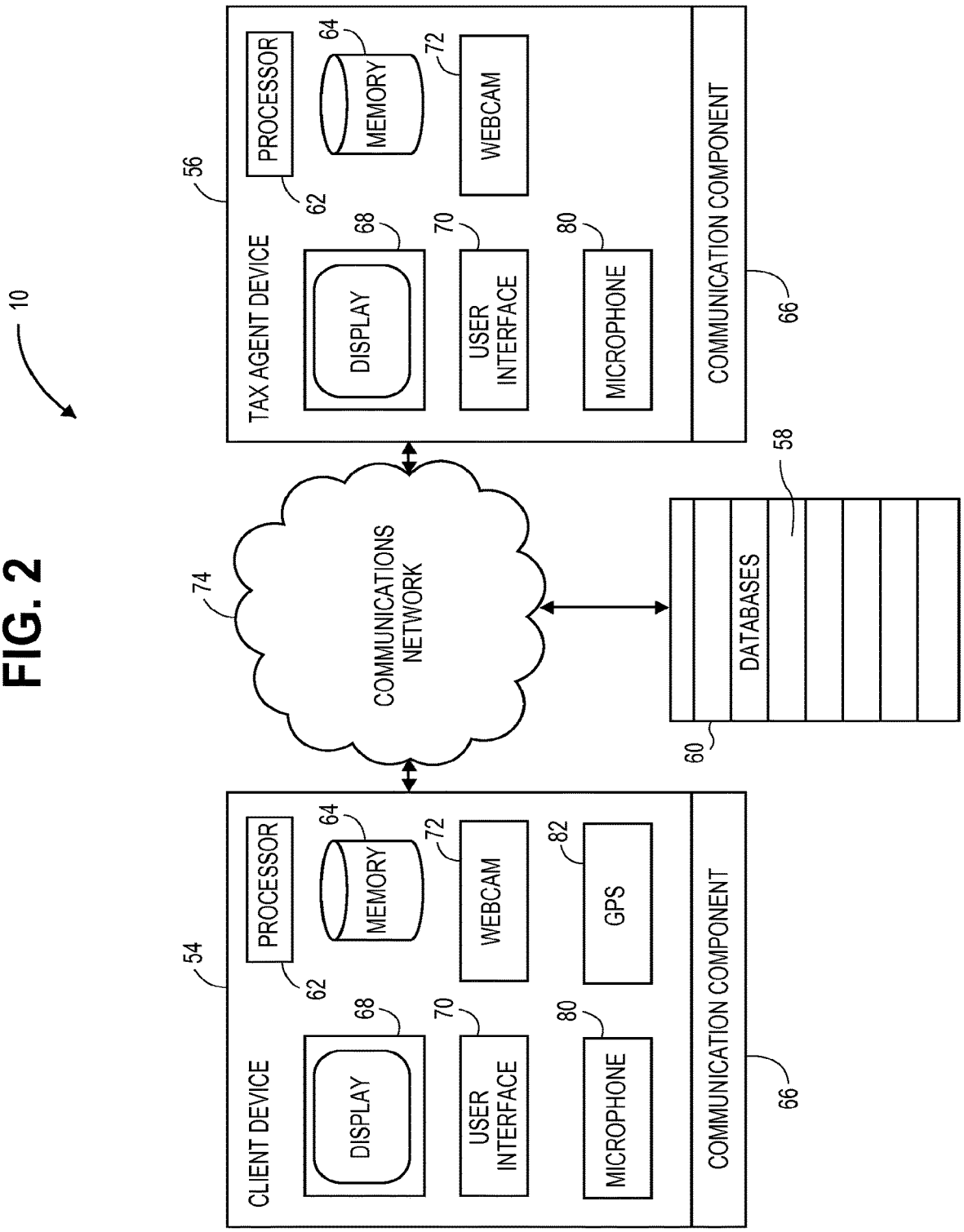
FIG. 2 is a block diagram illustrating the hardware of a system for the plurality of modules of FIG. 1.

System Hardware Description:

The system 10, as illustrated in FIG. 2, comprises a client device 54, a tax agent device 56, and one or more databases 58 that may be integral with or accessible by the client and tax agent devices 54,56. The databases 58 store the information accumulated from the tax consultation, including, without limitation, the client's registration information, the multi-communication feed 34, the conferencing feed 36, the tax-related documents for the client, the client's tax-related personal information, the tax returns/forms, and other information generated by the parties and as a result of the tax consultation. The databases 58 and/or portions of the databases may be stored on one or more memory elements located at one or more locations and accessible by the system 10. In embodiments of the present invention, the databases 58 are located at a server 60 separate and remote from the client and tax agent devices 54,56, such that the client and tax agent devices 54,56 access the databases 58 for performing the functions described herein. Additionally, the databases 58 may be managed via an RDMS or other database management system, and the databases 58 may include a look-up table to facilitate matching or cross-referencing of information stored in the databases 58.

In embodiments of the present invention, the client and tax agent devices 54,56, as illustrated in FIG. 2, are configured for receiving or accessing the tax preparation system, including the databases 58 and the modules described above. The devices 54,56 may be any of a mobile communication device, a personal computer, a laptop, a mobile phone, a smartphone, a PDA, or other suitable devices. The devices 54,56 may comprise any number and combination of processors 62 (like elements are labeled with the same reference numeral), controllers, integrated circuits, programmable logic devices, or other data and signal processing devices for carrying out the functions described herein, and may additionally comprise one or more memory storage devices, transmitters, receivers, and/or communication busses for communicating with the various devices of the system 10. In various embodiments of the invention, the devices 54,56 may comprise a memory element 64, a communication component 66, a display 68, user interface 70, a webcamera 72, and/or a microphone 80.

In embodiments of the invention, the client and tax agent devices 54,56 may implement a computer program and/or code segments of the computer program to perform some of the functions described herein. The computer program may comprise a listing of executable instructions for implementing logical functions in the devices 54,56. The computer program can be embodied in any computer readable medium, including a computer readable medium housed at the server 60, for use by or in connection with an instruction execution system, apparatus, or device, and execute the instructions. As used herein, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium include the following: a portable computer diskette, a random access memory (RAM), a read only memory (ROM), an erasable, programmable, read only memory (EPROM or flash memory), and a portable compact disk read only memory (CDROM), and combinations thereof.

The computer readable medium and the computer program embodied thereon may be remotely accessible by the devices 54,56, such as via a web browser or a stand alone, dedicated application, such as a mobile application. The web browser and/or dedicated application may be accessible via a communications network 74, such as the Internet. The various actions described herein as being performed by or using the computer program may actually be performed by one or more computers, processors, or other computational devices, such as the devices 54,56 described herein, independently or cooperatively executing portions of the computer program.

The memory element 64 may be integral with the respective devices 54,56, stand alone memory, or a combination of both. The memory element 64 may include, for example, a removable and non-removable memory element, such as RAM, ROM, flash, magnetic, optical, USB memory devices, and/or other memory elements. The memory element 64 may store one or more of the databases 58 described herein, code segments for accessing and using the databases 58, and/or other data for instructing the devices 54,56 to perform the functions and methods described herein. The memory element 64 may comprise a plurality of memory elements located within the devices 54,56 and/or located at a plurality of locations and accessible remotely via the respective communication component 66.

The communication component 66 may comprise a wireless transmitter/receiver, antenna, or any other wired or wireless device operable to send and/or receive data signals to and from the client and tax agent devices 54,56. For example, in some embodiments of the invention, the various databases 58 and/or the computer program described herein may be stored in separate locations or in separate memory elements and may be accessible remotely, such as over the Internet. Thus, the communication component 66 may be configured for sending and receiving data regarding the plurality of modules or otherwise determined using the computer program.

The display 68 may comprise a graphical interface operable to display visual graphics, images, text, etc. in response to external or internal processes and commands. For example, the display 68 may comprise conventional black and white, monochrome, or color display elements including CRT, TFT, LCD, and/or LED display devices. The display 68 may be integrated with the respective user interface 70, such as in embodiments where the display 68 is a touch screen display to enable the user to interact with it by touching or pointing at display areas to provide information to the respective device 54,56. The display 68 may be coupled with various other components of the respective devices 54,56 and may be operable to display various information corresponding to the modules of the present invention.

The user interface 70 enables the client and the tax agent to share information and input commands with the respective device 54,56. The user interface may comprise one or more functionable inputs, such as buttons, switches, scroll wheels, a touch screen associated with the display 68, voice recognition elements such as a microphone, pointing devices such as mice, touchpads, tracking balls, styluses, a camera, including a webcamera 72, such as a digital or film still or video camera, an optical scanner, and combinations thereof. The user interface 70 may also include a speaker for providing audible instructions and feedback and a microphone 80 for audio communication. Further, the user interface 70 may comprise wired or wireless data transfer elements, such as the communication component 66, a removable memory, data transceivers, and a transmitter, to enable the user and other devices or parties to remotely interface with the device or the system 10.

In embodiments of the present invention, each of the client's and tax agent's devices 54,56 has the webcam 70 or other camera for assisting in the conferencing feed 36, as described above. Moreover, although specialized software is not required for implementing the functions of the computer program of the present invention, certain web-browser plug-ins, such as FLASH™ may assist in the user experience.

It is to be appreciated that the components of the client's device need not be the same as the tax agent's device. For example, the tax agent may choose to have two displays.

Figure 3:
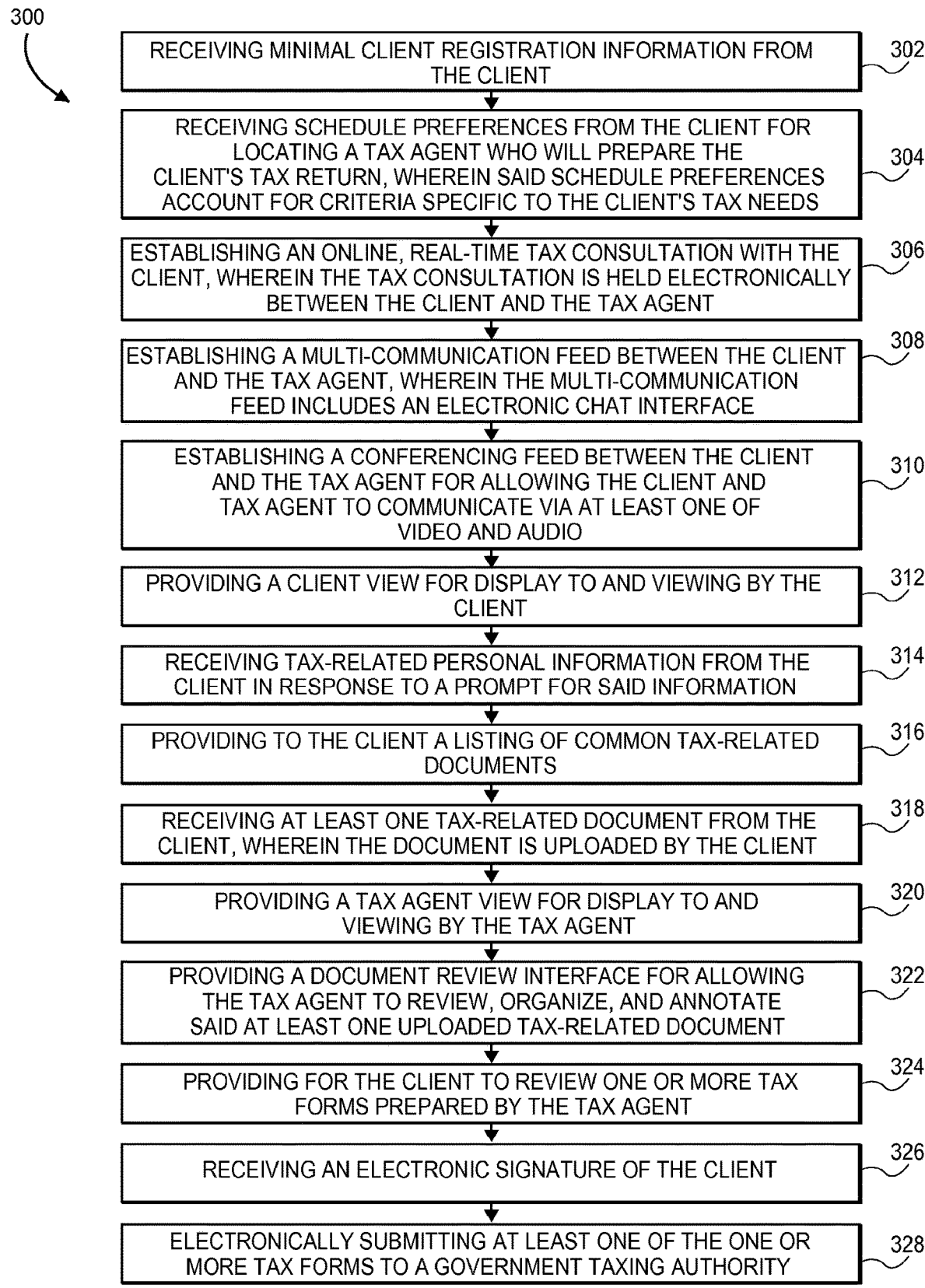
FIG. 3 is a flow chart of a method for performing the plurality of modules of FIG. 1.

Operation of the Computer Program and Steps of the Method:

In use, the computer program stored on the computer readable storage medium associated with and/or accessible by the client and tax agent devices 54,56 may be executed to perform the functions described in the plurality of system modules and the steps of the method of embodiments of the present invention. The flow chart of FIG. 3 depicts the steps of exemplary methods of the invention in more detail. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

FIG. 3 illustrates a method 300 of performing a tax consultation for preparation of the client's taxes, wherein the tax consultation is held via the online, real-time platform, and the tax agent is remote from the client. As discussed above, the client may begin a tax session comprising the tax consultation by accessing the computer program of embodiments of the present invention. The computer program is accessible via a website, a stand-alone application, or other known online platforms. Upon accessing the computer program (referred to hereafter as the "application" for ease of reference) and indicating an interest to begin the tax consultation, the method of embodiments of the present invention receives minimal client registration information in response to one or more prompts presented to the user via the application, as indicated at Step 302 of FIG. 3. The client is then presented with one or more schedule preferences selectable by the client, such as whether the client desires to locate a tax agent available now versus scheduling an appointment, as indicated at Step 304. In embodiments of the present invention, the schedule preferences of the client comprise either or both and at the least an expertise of the tax agent needed for preparing the client's taxes and a geographical proximity of the tax agent to the client.

After the client has been matched with a tax agent, the online, real-time tax consultation between the client and the tax agent is established, as indicated at Step 306. The tax consultation is held via the application, such that the tax agent is remote from the client, and all aspects of the tax consultation are held electronically and online. "Online" as used herein is intended to encompass the tax agent and client communicating via a public switched telephone network, the Internet, including use of Voice over Internet Protocol ("VoIP"), and other communications networks.

To assist the client and the tax agent in communicating during the consultation, the multi-communication feed having the electronic chat interface and the conferencing feed are established, as indicated in Steps 308 and 310, respectively. As noted above, the client can choose whether to video conference with the tax agent or have audio only.

The method as implemented by the computer program of the present invention provides a client view for display to and viewing by the client, as indicated at Step 312. The client view comprises the windows, inputs, multi-communication feed, conferencing feed, and other features of the computer program for display by the client during the tax session. The client view is personal to the client (although there are general consistencies among multiple clients), and the client view can be arranged by the client to their desired preferences.

The client is next presented with one or more prompts for further information, including tax-related personal information, and the method of embodiments of the present invention receives such information from the client in response to the prompts, as indicated at Step 314. The prompts comprise input screens that specifically identify the requested information and questions set forth by the tax agent in one or both of the multi-communication and conferencing feeds.

Because most, if not all, tax returns require some documents personal to the client, the method of the present invention provides to the client a listing of common tax-related documents, as indicated at Step 316, and receives at least one uploaded tax-related document from the client, as indicated at Step 318. In embodiments of the present invention, the client may push a tax-related document to the computer program via a third-party site, such as payroll provider who has an electronic copy of the client's tax-related document.

The method as implemented by the computer program of the present invention provides a tax agent view for display to and viewing by the tax agent, as indicated at Step 320. The tax agent view includes providing a document review interface for allowing the tax agent to review, organize, and annotate the tax-related documents of the client, as indicated at Step 322.

Upon completion by the tax agent of the tax forms comprising the tax return, the method provides for the client to review the tax forms, as indicated at Step 324. As discussed above, the client can download or otherwise view the tax forms at the computer program of the present invention. Further, the client can choose to receive a notification, such as e-mail or text, once the forms are prepared.

After the client has reviewed the tax forms, the client is requested to approve the forms. Approval can be indicated by receiving an electronic signature of the client, as indicated at Step 326. The forms are then electronically submitted to a government taxing authority, as indicated at Step 328.

Although the invention has been described with reference to the embodiments illustrated in the attached drawing figures, it is noted that equivalents may be employed and substitutions made herein without departing from the scope of the invention as recited in the claims. For example, the present invention has been described with respect to assisting a client in the preparation of the client's tax return. However, the present invention could be employed in other financial offerings. For example, the present invention could be employed to assist a client in choosing certain investment opportunities, including stocks, funds, etc. In even further embodiments of the present invention, the shared information module 18 is operable to receive tax-related documents including receipts of purchased goods or services, at any time throughout the tax year. In particular, the client may upload or otherwise save in the secure repository or vault tax-related documents at any time and not necessarily contemporaneous with the tax consultation. This allows the client the ability to have a single, secure repository for all tax-related documents. Moreover, this allows the client the flexibility to upload the tax-related documents at the client's convenience and not necessarily at one time or at a time generally contemporaneous with preparation of the tax return.

In even further embodiments of the present invention and as briefly described above, not all interaction between the client and the tax agent need be online and via the platform provided by the present invention. For example, some communication between the client and tax agent may be "offline," such as a telephone call or text message. Or, the parties may send each other communications using the platform but between tax consultation sessions. For example, the client can "sign on" to the client's account and send a message to the tax agent via one or both of the multi-communication feed or conferencing feed. Alternatively or in addition, the client may initially establish the client account, upload the tax-related documents, but approve the tax return in person at the tax agent's office. Therefore, it should be appreciated that one or more actions or activities that comprise delivery of the consumer tax services may be performed offline and separate from the computer program of embodiments of the present invention.

Having thus described various embodiments of the invention, what is claimed as new and desired to be protected by Letters Patent includes the following:

1. A computerized method for online, real-time tax consultation between a client and a remote tax agent for preparation of a tax return for the client, the method comprising the following steps:
   receiving, from the client via a client device, minimal registration information which includes location information for the client;
   selecting the tax agent based at least in part on the minimal registration information and the location information,
   wherein the tax agent has an associated tax agent device with a webcam;
   establishing a video conference between the client device and the tax agent device;
   presenting, to the client on the client device, a video representation of the tax agent from the webcam of the tax agent device;
   presenting, to the tax agent on the tax agent device, an audio-only representation of the client from a microphone of the client device;
   establishing a multi-communication feed between the client and the tax agent, wherein the multi-communication feed includes an electronic chat interface through which the client and the tax agent communicate via written word;
   presenting, to the client on the client device, a client module;
   allowing the tax agent to control the client module and highlight points of interest on the client module;
   requesting, via the client module within the electronic chat interface, the client to enter tax-related information;
   rendering, in a client view within the client module within the electronic chat interface, a checklist associated with tax-related documents, the checklist rendered based on the minimal registration information and contents of the tax-related documents;
   submitting tax-related information to a taxing authority based on the checklist;
   in response to determining that the tax return has been accepted by the taxing authority, updating an accepted status;
   automatically updating a completion indication associated with the checklist upon completion of a particular task associated with the tax-related information regarding the client;
   providing, by way of the electronic chat interface, an automatic completion indication based on the accepted status, wherein the automatic completion indication comprises a changeable icon; and
   receiving, from the client device, an electronic signature of the client.

2. The computerized method of claim 1, wherein the minimal registration information is indicative of a state taxing authority with which a state tax return must be filed.

3. The computerized method of claim 1, wherein the minimal registration information is indicative of a tax-related expertise field related to said tax return.

4. The computerized method of claim 1, further comprising:
   submitting the tax return to a taxing authority electronically.

5. The computerized method of claim 1, further comprising:
   presenting, on the client device, a listing for review by the client of the tax-related documents.

6. The computerized method of claim 1, further comprising:
   electronically receiving the tax-related information for the client from a financial institution associated with the client.

7. The computerized method of claim 1, further comprising:
   presenting, on the client device, a prompt that invites the client to validate previously-stored information,
   wherein the previously-stored information relates to a previous tax return for the client.

8. The computerized method of claim 1, further comprising:
   automatically entering at least a portion of said tax-related information onto the tax return.

9. The computerized method of claim 1, further comprising:
   automatically obtaining, from the client device, a geographic location of the client, wherein the client device is a smart phone.

10. The computerized method of claim 1, further comprising:
    receiving, from the client device, an uploaded tax-related document for review by the tax agent.

11. The computerized method of claim 10, further comprising:
    receiving, from the tax agent device, an annotation associated with said tax-related document; and
    displaying, on the client device, said annotations on said tax-related document for viewing by the client during the tax consultation.

12. The computerized method of claim 10, further comprising:
    storing the tax-related document for accessing by the client or the tax agent at a time subsequent to the tax consultation.

13. A computerized method for online, real-time tax consultation between a client and a remote tax agent for preparation of a tax return for the client, the method comprising the following steps:
    receiving, from the client via a client device, minimal registration information which includes location information for the client;
    selecting the tax agent based at least in part on the minimal registration information and the location information,
    wherein the tax agent has an associated tax agent device with a webcam;
    establishing a video conference between the client device and the tax agent device;
    presenting, to the client on the client device, a video representation of the tax agent from the webcam of the tax agent device;
    presenting, to the tax agent on the tax agent device, an audio-only representation of the client from a microphone of the client device;
    establishing a multi-communication feed between the client and the tax agent, wherein the multi-communication feed includes an electronic chat interface through which the client and the tax agent communicate via written word;
    presenting, to the client on the client device, a client module;
    receiving, from the client device, an uploaded tax-related documents by the client for review by the tax agent;
    receiving, from the tax agent device, an annotation associated with said tax-related document;
    displaying, on the client device, said annotations on said tax-related document for viewing by the client during the tax consultation;
    requesting, via the client module within the electronic chat interface, the client to enter tax-related information;
    rendering, in a client view within the client module within the electronic chat interface, a checklist associated with the tax-related documents, the checklist rendered based on the minimal registration information and contents of the tax-related documents;
    submitting tax-related information to a taxing authority based on the checklist;
    in response to determining that the tax return has been accepted by the taxing authority, updating an accepted status;
    automatically updating a completion indication associated with the checklist upon completion of a particular task associated with the tax-related information regarding the client;
    providing, by way of the electronic chat interface, an automatic completion indication based on the accepted status, wherein the automatic completion indication comprises a changeable icon; and
    receiving, from the client device, an electronic signature of the client.

14. The computerized method of claim 13, further comprising:
    submitting the tax return to a taxing authority electronically.

15. The computerized method of claim 13, further comprising:
    presenting, on the client device, a listing for review by the client of tax-related documents.

16. The computerized method of claim 13, further comprising:
    electronically receiving the tax-related information for the client from a financial institution associated with the client.

17. The computerized method of claim 13, further comprising:
    allowing the tax agent to control the client module and highlight points of interest on the client module.

18. The computerized method of claim 13, further comprising:
    storing the tax-related documents for accessing by the client or the tax agent at a time subsequent to the tax consultation.

19. The computerized method of claim 13, further comprising:
    automatically entering at least a portion of said tax-related information onto at least one tax document.

20. A computerized method for online, real-time tax consultation between a client and a remote tax agent for preparation of a tax return for the client, the method comprising the following steps:

receiving, from the client via a client device, minimal registration information indicative of a state taxing authority with which a state tax return must be filed;

selecting the tax agent based at least in part on the minimal registration information and location information, wherein the tax agent has an associated tax agent device with a webcam;

establishing a video conference between the client device and the tax agent device;

presenting, to the client on the client device, a video representation of the tax agent from the webcam of the tax agent device;

presenting, to the tax agent on the tax agent device, an audio-only representation of the client from a microphone of the client device;

establishing a multi-communication feed between the client and the tax agent, wherein the multi-communication feed includes an electronic chat interface through which the client and the tax agent communicate via written word;

presenting, to the client on the client device, a client module;

receiving, from the tax agent device, an annotation associated with a tax-related document;

displaying, on the client device, said annotations on said tax-related document for viewing by the client during the tax consultation;

requesting, via the client module within the electronic chat interface, the client to enter tax-related personal information;

rendering, in a client view within the client module within the electronic chat interface, a checklist associated with the tax-related document, the checklist rendered based on the minimal registration information and contents of the tax-related document;

submitting tax-related information to a taxing authority based on the checklist;

in response to determining that the tax return has been accepted by the taxing authority, updating an accepted status;

automatically updating a completion indication associated with the checklist upon completion of a particular task associated with the tax-related information regarding the client;

providing, by way of the electronic chat interface, an automatic completion indication based on the accepted status, wherein the automatic completion indication comprises a changeable icon; and receiving, from the client device, an electronic signature of the client.

* * * * *